(12) United States Patent
Kim

(10) Patent No.: US 7,376,825 B2
(45) Date of Patent: May 20, 2008

(54) SYSTEM AND METHOD FOR ACCESSING VITAL DATA FROM MEMORY

(75) Inventor: Chang-Rae Kim, Yongin-si (KR)

(73) Assignee: Samsung Electronics Co., Ltd, Suwon-si, Gyeonggi-do (KR)

( * ) Notice: Subject to any disclaimer, the term of this patent is extended or adjusted under 35 U.S.C. 154(b) by 379 days.

(21) Appl. No.: 11/091,286

(22) Filed: Mar. 28, 2005

(65) Prior Publication Data

US 2005/0268086 A1    Dec. 1, 2005

(51) Int. Cl.
*G06F 9/00*    (2006.01)
*G06F 15/177*    (2006.01)

(52) U.S. Cl. .................. 713/2; 713/1; 714/36; 714/719

(58) Field of Classification Search .................. 713/1, 713/2
See application file for complete search history.

(56) References Cited

U.S. PATENT DOCUMENTS

| | | | | |
|---|---|---|---|---|
| 5,363,446 A | * | 11/1994 | Ruppertz et al. | 713/1 |
| 5,809,531 A | | 9/1998 | Brabandt | 711/141 |
| 6,550,007 B1 | * | 4/2003 | Baxter et al. | 713/2 |
| 7,188,235 B2 | * | 3/2007 | Wang et al. | 713/1 |

FOREIGN PATENT DOCUMENTS

| | | |
|---|---|---|
| EP | 0 468 625 | 8/1998 |
| KR | 10-2000-0016908 | 3/2000 |
| WO | 03/060670 | 7/2003 |

* cited by examiner

*Primary Examiner*—Thomas Lee
*Assistant Examiner*—Jaweed A Abbaszadeh
(74) *Attorney, Agent, or Firm*—F. Chau & Associates, LLC

(57) ABSTRACT

A memory system is provided which comprises a main memory that stores main data and reference data; a first storage that stores the reference data; and a controller that accesses the reference data from the main memory upon receipt of a power up signal, and loads the main data into a second storage when the reference data retrieved from the main memory is tested to be the same as the reference data in the first storage. A method is also provided for booting a nonvolatile memory, comprising prestoring in a main memory a boot code and a reference data; prestoring the reference data in a register; accessing the reference data from the main memory when power is turned on; comparing the reference data in the register against the reference data accessed from the main memory; and loading the boot codes into a boot RAM if the reference data in the register is the same as the reference data accessed from the main memory and if not the same, repeating accessing and comparing the reference data from the main memory against the reference data in the register.

32 Claims, 10 Drawing Sheets

SYSTEM AND METHOD FOR ACCESSING VITAL DATA FROM MEMORY

1. Technical Field

The present disclosure is directed to a system and a method for safely accessing vital data from memory; in particular, a system and a method for ensuring that vital data stored in memory is accessed without error upon system power on.

2. Discussion of Related Art

In almost every processing device having a processor and a memory, the processor controls the device by accessing control data for properly turning on and operating the components connected to the processor. Generally, a preassigned area of memory is used to store data vital for operating the processing device, for example, the BIOS code, boot code, and other system turn on data stored in a boot block area of the memory for access by the processor upon turn on of the device. In the instance of a boot code, the processor first accesses the boot code in the boot block of the memory when the device is powered on. The processing device, such as a personal computer, is "booted up" by execution of the boot code retrieved from the memory when power is turned on. In devices or systems which derive power from a power supply, there is power "ramp-up", typically in hundreds of microseconds, for the power supply to reach full operating voltage. If data is read from memory prior to the power supply reaching full operating voltage, the data may not be read correctly. In such instance, an error will likely occur during the boot operation and the device or system cannot be properly initiated.

One proposal to avoid a boot operation error due to pre-full-voltage access of boot code from memory is an intentional delay by use of a delay circuit or oscillator to delay the memory access of the boot code for a predetermined amount of time to allow the power supply to reach full operating voltage before memory access. However, if the setting of the delay time is too lengthy, the amount of time needed to "boot up" a processing device is increased, and if the predetermined delay is too short, the power supply voltage may not yet reach full operating voltage and data access from the memory may be erroneous due to insufficient voltage. Further, it may be difficult to preset a certain predetermined time of delay because the voltage turn on rate differs for each power supply.

A need therefore exists for a device or method for safely accessing data from memory irrespective of variations in power supply turn on.

SUMMARY OF THE INVENTION

A memory system is provided, comprising of a main memory that stores main data and reference data; a first storage that stores the reference data; and a controller that accesses the reference data from the main memory upon receipt of a power up signal, and loads the main data into a second storage when the reference data retrieved from the main memory is tested to be the same as the reference data in the first storage. The first storage is a register and the second storage is a RAM.

According to an aspect of the invention, the main data includes boot code. The reference data is predetermined code preloaded in the main memory and the first storage. The main memory is a nonvolatile memory.

According to another aspect of the invention, the main memory is a flash memory, and further preferred to be a NAND type. The reference data is prestored in a one time programmable (OTP) block.

According to still another aspect, the first storage is embedded in the controller, the controller and the main memory are embedded within a single chip, or the memory system is disposed on a memory card.

A circuit is also provided which comprises a memory having prestored boot code and reference data; and a controller having a register with the prestored reference data, wherein upon power turn on the controller accesses the reference data from the memory and compares the accessed reference data against the reference data stored in the register, and loads the boot code into a boot RAM if the reference data accessed from the memory is the same as in the register.

The circuit further including a delay circuit that delays accessing the reference data for a given time period when power is turned on. The delay circuit is an oscillator, wherein the predetermined delay time period is about 100 to 200 microseconds. The memory is preferably a nonvolatile memory, which can be a flash memory, and of a NAND type. The circuit is preferably integrated in a single chip.

According to still another aspect of the invention, a method of loading data is provided, comprising of storing main data and reference data in a main memory; storing the reference data in a first storage; accessing the reference data from the main memory upon receipt of a power up signal; comparing the reference data in the first storage against the reference data accessed from the main memory; and loading the main data into a second storage if the reference data in the first storage is the same as the reference data accessed from the main memory, wherein the main memory is a nonvolatile memory or a NAND flash memory, the first storage is a register and the second storage is a RAM, wherein the reference data is stored in a one time programmable (OTP) block.

Preferably, the main data includes boot code, wherein the main data and reference data is preloaded in the main memory, the reference data is preloaded in the first storage and the power up signal is generated upon power turn on.

The method further including reaccessing the reference data from the main memory if the reference data retrieved from the main memory is not the same as the reference data in the first storage.

According to another method of booting a nonvolatile memory includes prestoring in a main memory a boot code and a reference data; prestoring the reference data in a register; accessing the reference data from the main memory when power is turned on; comparing the reference data in the register against the reference data accessed from the main memory; and loading the boot codes into a boot RAM if the reference data in the register is the same as the reference data accessed from the main memory and if not the same, repeating accessing and comparing the reference data from the main memory against the reference data in the register.

BRIEF DESCRIPTION OF THE DRAWINGS

The features of the present invention will become understood by those having ordinary skill in the art by describing, in detail, exemplary embodiments thereof with reference to the attached drawings, wherein like elements are represented by like reference numerals.

DETAILED DESCRIPTION OF PREFERRED EMBODIMENTS

Figure 1:
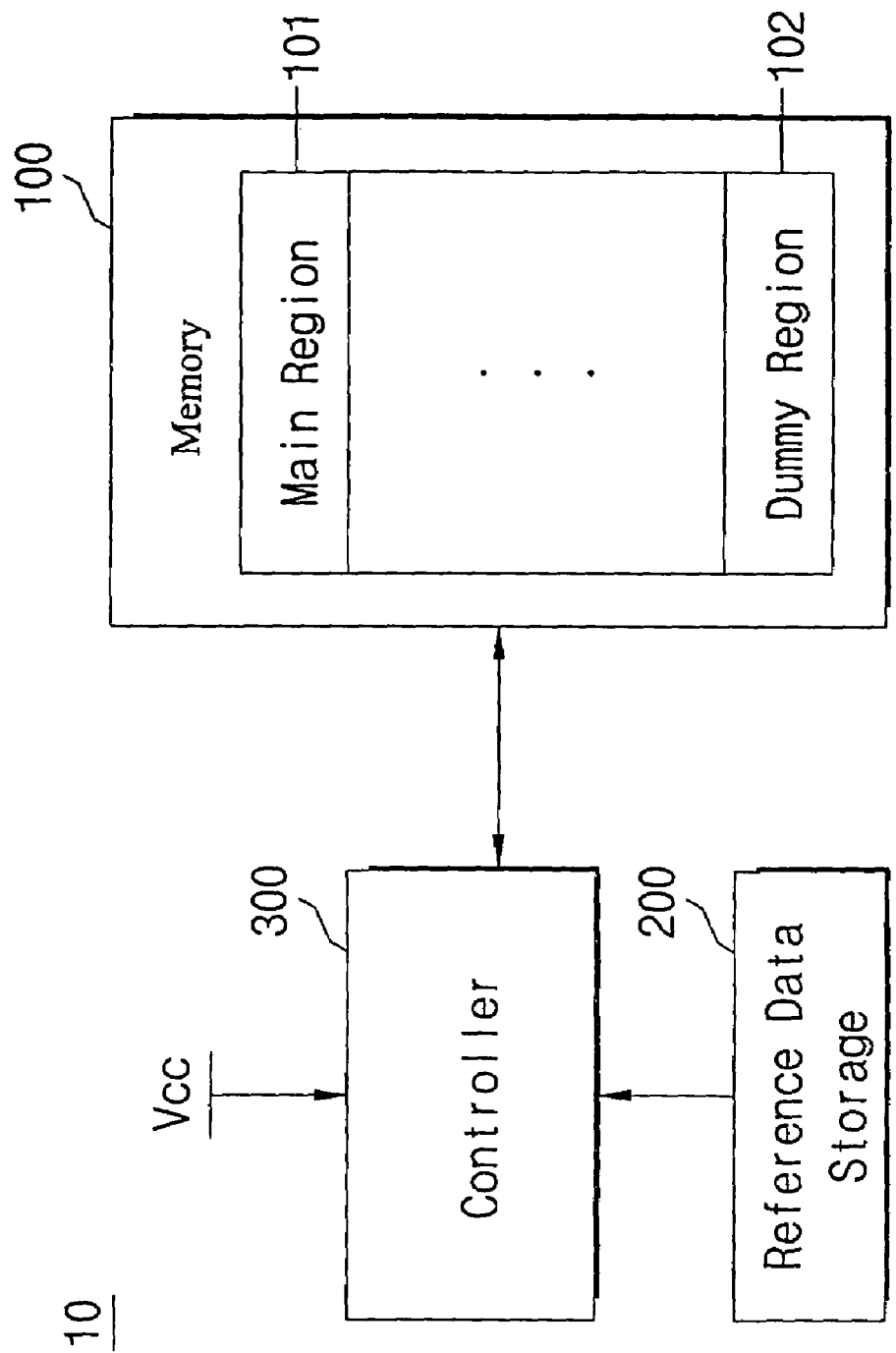
FIG. 1 is a block diagram of a memory system according an embodiment of the present invention.

FIG. 1 shows a block diagram of a memory system according to an embodiment of the present invention. Referring to FIG. 1, a memory system 10 includes a memory 100, a controller 300, and a reference data storage 200. The memory 100 has a main region 101 for storing main data which is the data vital to operation of the memory system. Examples of main data are boot code, BIOS code, or operation system code, etc. The memory 101 also includes a dummy region 102 for storing test data (hereinafter referred to as "dummy data"), which is data used for testing the readiness of the applied voltage, as will be described further below. The dummy data is also stored in the reference data storage 200. The controller 300 includes a processor (not shown) for controlling the operations of the memory system including retrieving data from the memory 100 and from the reference data storage 200. When the memory system 10 is first turned on, or when there is a power-on-reset operation, voltage Vcc is supplied to the memory system 10 from a power supply. As in most processing devices, when power is turned on, the controller 300 retrieves the operating system code such as the boot code from the memory 100 to boot up the memory system. According to the present embodiment of the invention, the reference data storage 200 is prestored with the same dummy data that is stored in the dummy region 102 of the memory 100. Upon turn on or power on reset (POR), the controller 300 retrieves the dummy data from the dummy region 102 of the memory 100 and compares the retrieved dummy data with the dummy data that was also prestored in the reference data storage 200. The comparison will output a true compare if the dummy data retrieved from the dummy region 102 of the memory 100 is the same as the dummy data retrieved from the reference data storage 200. If the voltage Vcc supplied to the memory system has not reached an adequate voltage level, the dummy data retrieved from the dummy region 102 of memory 100 will not be correct and the comparison will not yield a true output. Upon a false output from the comparison, the controller 300 repeats the retrieval of the dummy data and the comparison processes until the compare operation shows that the dummy data retrieved from the memory 100 is the same as the dummy data stored in the reference data storage 200. A true comparison signifies that the voltage Vcc applied at the memory system has reached full voltage or in any case has reached a voltage level adequate for retrieval of data correctly from the memory 100. Then, the main data in main region 101 of the memory 100 is retrieved by the controller 300.

Figure 2:
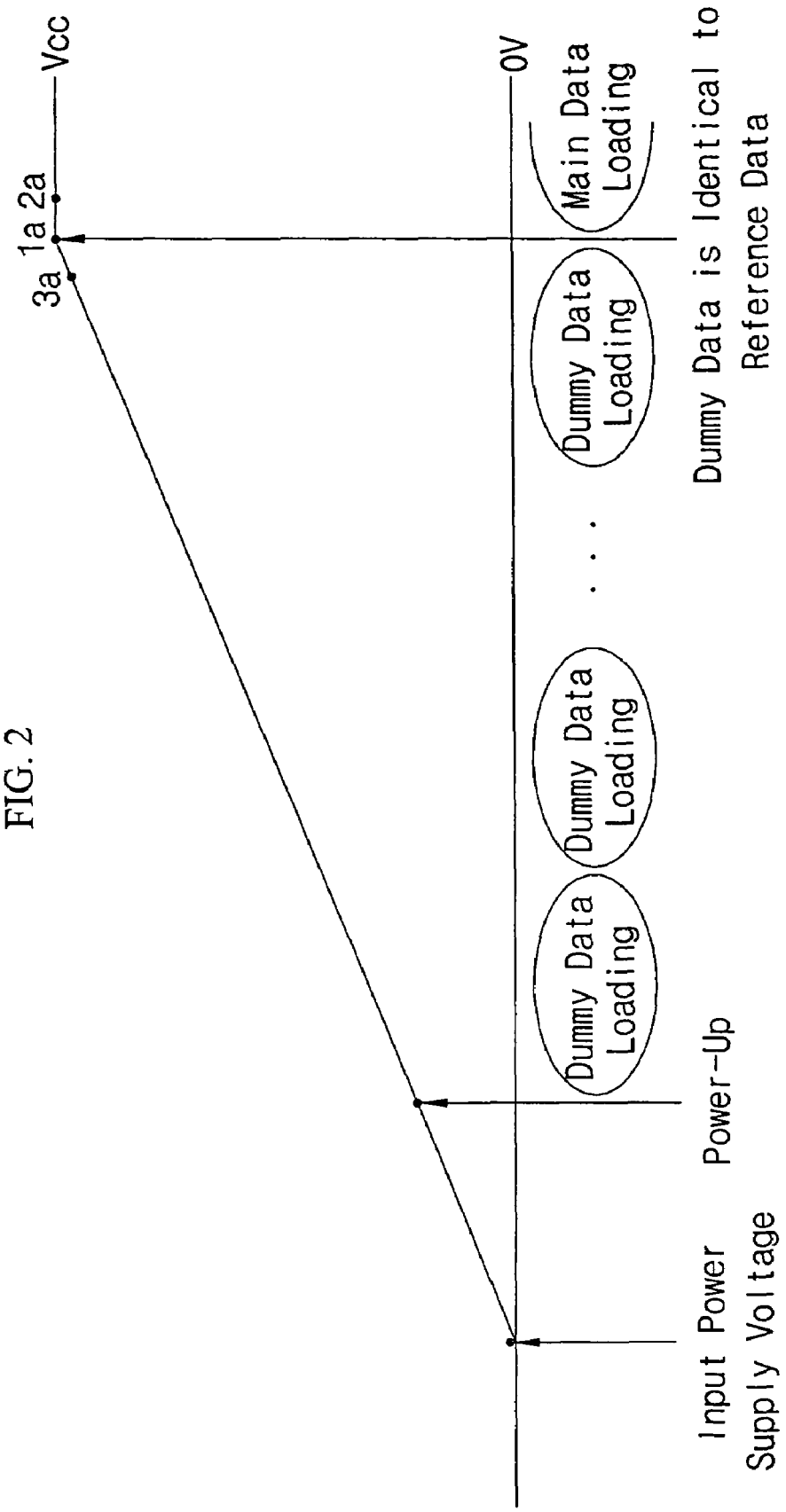
FIG. 2 is a graphical showing of the operations of the system of FIG. 1.

FIG. 2 is a graphical illustration of the main data retrieval process performed by the memory system 10 of FIG. 1. As shown in FIG. 2, upon a power up signal such as from a POR operation, dummy data is iteratively loaded from the memory 100 until the dummy data is compared to the reference data to be identical, after which the main data is retrieved from the memory 100. The main data retrieval can start the same time the applied voltage Vcc reaches full operating voltage at time 1a, or after Vcc have reached full operating voltage at time 2a, or before Vcc reached full operating voltage at 3a, so long as the dummy data retrieved from the memory 100 compares to be identical with the dummy data prestored in reference data storage 200. This process ensures that the memory system 10 operates properly with adequate applied voltage at Vcc such that data retrieved from the memory 100 is not erroneous before the vital data is loaded.

Referring again to FIG. 1, the reference data storage 200 can be any data storage device such as a register, RAM, ROM or the like. The reference data storage 200 can be within the controller 300 or connected to the controller 300. The memory 100 can be volatile or nonvolatile memory, such as RAM, ROM, or flash memory.

Figure 3:
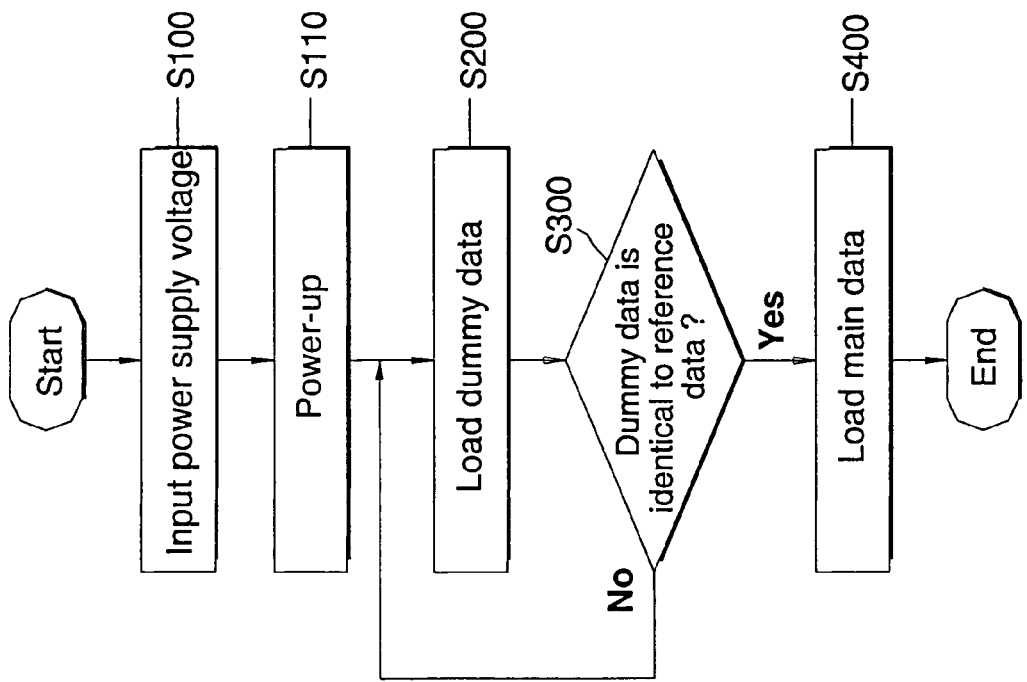
FIG. 3 is a flowchart illustrating an exemplary process of operation of the memory system of FIG. 2.

FIG. 3 is a flowchart showing an exemplary process of loading main data using a memory system or FIG. 1. Upon power on reset, the input power supply voltage Vcc is applied to the memory system 10 (S100). Upon turn on or a POR signal, power supply ramps up to supply the voltage Vcc (S110). The controller 300 retrieves the dummy data from the dummy region 102 (S200). The controller 300 retrieves the dummy data stored in the reference data storage 200 and compares the two dummy data to determine if they are identical (S300); if the two dummy data are not identical, a false compare is output and dummy data is again retrieved from dummy region 102 of the memory 100, and the newly retrieved dummy data is again compared against the dummy data retrieved from reference data storage 200. This loading and comparing process repeats until the comparison shows the two dummy data are identical, by a true compare output. Then, the main data is loaded or retrieved from the main region 101 of the memory 100 (S400).

Figure 4:
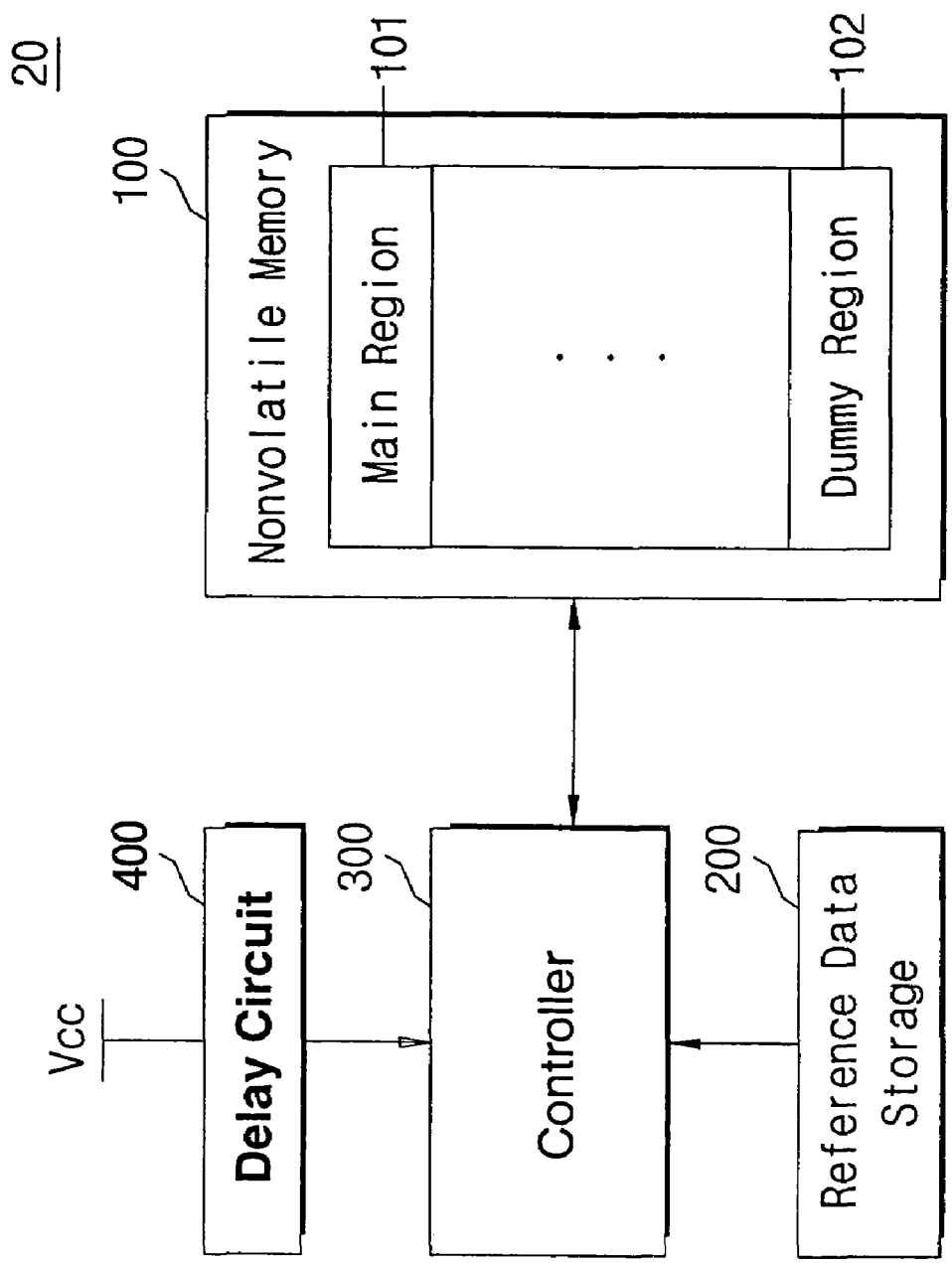
FIG. 4 is a block diagram showing a memory system according to another embodiment of the present invention.

FIG. 4 shows a memory system according to another embodiment of the present invention. A delay circuit 400 is introduced for the present embodiment, the other components of the memory system 20 include a memory 100, a controller 300, and a reference data storage 200. These components bear like numerals as in FIG. 1 and their operations and functions are the same as that described for FIG. 1 above, except the delay circuit serves to delay the application of voltage Vcc by a predetermined time as set by the delay circuit 400. Thus, the retrieval of dummy data from the memory 100 does not commence until after the time delay has elapsed. The memory system 20 is preferably disposed on a memory card.

Figure 5:
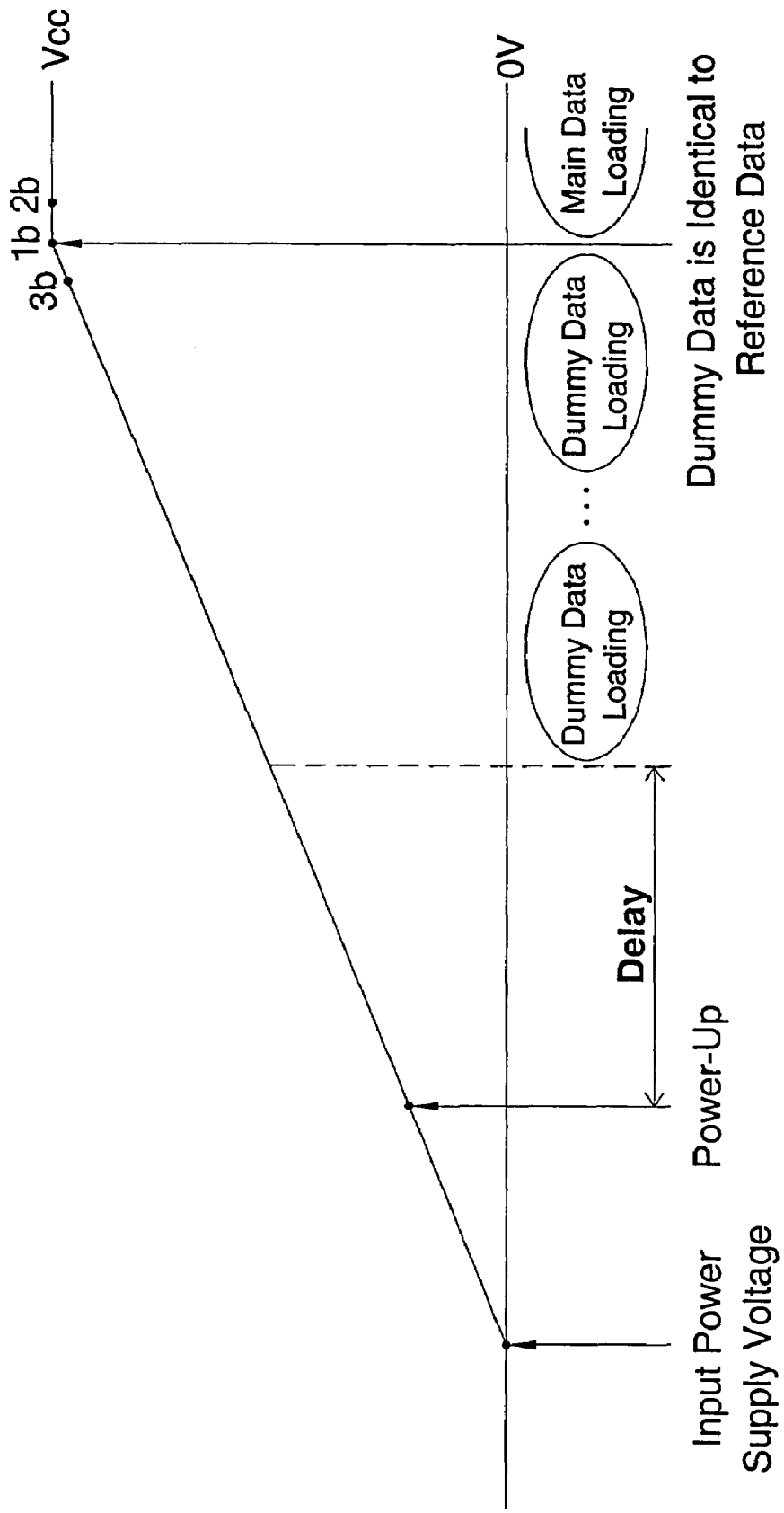
FIG. 5 is a graphical illustration of the operation of the memory system of FIG. 4.

FIG. 5 is a graphical illustration of the main data retrieval process performed by the memory system 20 of FIG. 4. As shown in FIG. 5, upon a power up signal such as from a POR operation, input power supply voltage is applied and Vcc ramps up. After a time delay for a duration as set by the delay circuit 400, dummy data is iteratively loaded from the memory 100 until the dummy data is compared to the reference data to be identical, after which the main data is retrieved from the memory 100. According to this embodiment, the dummy data retrieval does not start until after the delay time period, but main data retrieval can start the same time the applied voltage Vcc reaches full operating voltage at time 1b, or after Vcc have reached full operating voltage at time 2b, or before Vcc reached full operating voltage at 3b, so long as the dummy data retrieved from the memory 100 compares to be identical with the dummy data prestored in reference data storage 200. The use of a delay circuit according to the present embodiment decreases the number of iterative retrieval and comparison processes while ensuring that the memory system 10 operates properly with adequate applied voltage at Vcc such that data retrieved from the memory 100 is not erroneous before the vital data is loaded. The delay circuit is preferably implemented by an oscillator, an resistor-capacitor (RC) time constant network, or a wire delay. The time delay is preferably about 100 to 200 microseconds.

Figure 6:
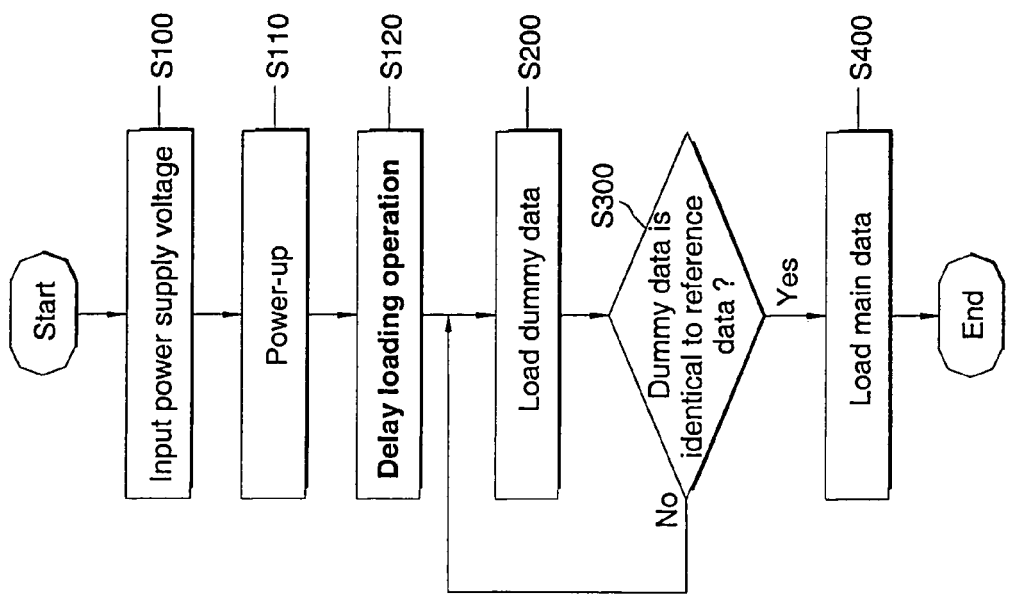
FIG. 6 is a flowchart showing an exemplary process of operation of the memory system of FIG. 4.

FIG. 6 is a flowchart showing an exemplary process of loading main data using a memory system or FIG. 4. Upon power on reset, the input power supply voltage Vcc is applied to the memory system 20 (S100). Upon turn on or a POR signal, power supply ramps up to supply the voltage Vcc (S110). The application of the voltage Vcc is delayed by the delay circuit 400 for the predetermined time duration (S120). Then, the controller 300 retrieves the dummy data from the dummy region 102 (S 200). The controller 300 retrieves the dummy data stored in the reference data storage 200 and compares the two dummy data to determine if they are identical (S300); if the two dummy data are not identical, a false compare is output and dummy data is again retrieved from dummy region 102 of the memory 100, and the newly retrieved dummy data is again compared against the dummy data retrieved from reference data storage 200. This loading and comparing process repeats until the comparison shows the two dummy data are identical, by a true compare output. Then, the main data is loaded or retrieved from the main region 101 of the memory 100 (S400).

Figure 7:
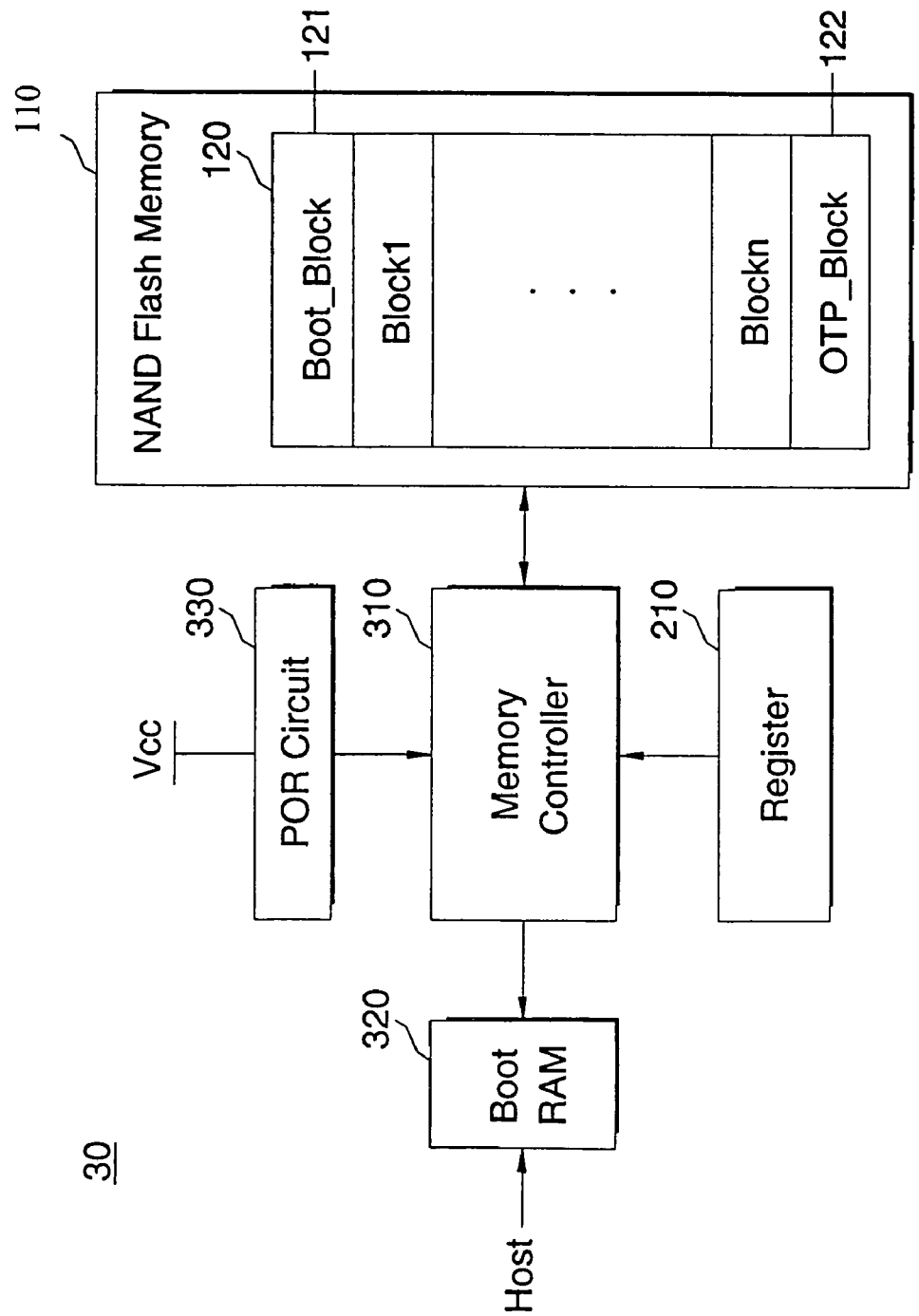
FIG. 7 is a block diagram of a memory system according to another embodiment of the present invention.

FIG. 7 is a block diagram of a memory system 30 according to another embodiment of the present invention. Referring to FIG. 7, the memory system 30 includes a flash memory 110, a power-on-reset circuit 330, a memory controller 310, a register 210, and a boot RAM 320.

The flash memory 110 is preferably a NAND-type, having a memory cell array 120 with a plurality of blocks Boot_Block, Block1-Blockn, and an one-time-programmable (OTP)_Block. The boot block 121 is typically used for storing a boot code which the processor accesses to perform a booting operation. The OTP block 122 is typically used for storing a user-desired ID of a flash memory (e.g., serial number of a manufacturer, a manufacture date, or security data). The OTP data is programmed only one time in the OTP_Block. According to the present embodiment of the invention, the dummy data can be stored in the OTP_Block 122 of the flash memory 110 and in the register 210. The memory controller 310 controls all operations of the memory system 30 during a booting operation. To safely load a boot code after a power supply voltage (Vcc) is applied and the memory system 30 is powered up by the POR circuit 330, the memory controller 310 iteratively loads the OTP (dummy) data before loading the boot code. The OTP data is compared with the reference data stored in the register 210. If the OTP data is identical to the reference data, the memory controller 310 loads the boot code in the boot block 121 and transfers the loaded boot code to the boot RAM 320. The boot RAM 320 stores the boot code transferred from the NAND flash memory 110. A host accesses the boot code stored in the boot RAM 320 to perform the boot operation.

Figure 8:
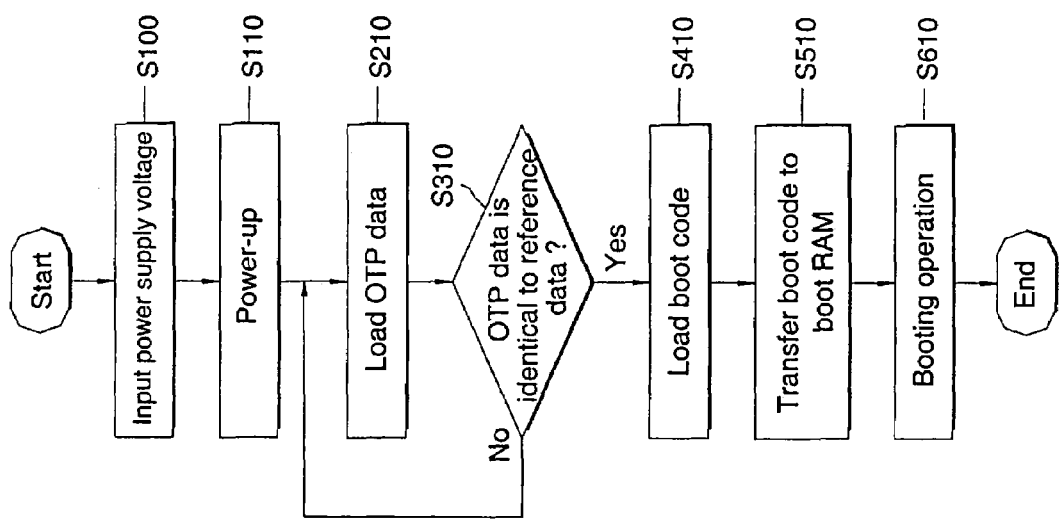
FIG. 8 is a flowchart illustrating an exemplary process of operation of the memory system of FIG. 7.

FIG. 8 is a flowchart showing the steps of booting the memory system 30 shown in FIG. 7. A power supply voltage (Vcc) is applied to the memory system 30 (S100). If the memory system 30 is powered up by a POR circuit 330 (S110), a memory controller 310 loads OTP data in an OTP block 122 (S210). The memory controller 310 checks whether the OTP data is identical to reference data stored in the register 210 (S310). If the OTP data is not identical to the reference data, the memory controller 310 reloads the OTP data in the OTP block 122. While the OTP data is iteratively loaded, the power supply voltage ramps up to full voltage by the POR circuit 330. Any known power up circuit can be used as the POR circuit for applying the voltage Vcc to the memory controller 310. Upon the applied voltage Vcc reaching a voltage level adequate for properly operating the components of the memory system 30, the OTP data retrieved from flash memory 110 will compare identically to the reference (dummy) data stored in register 210. Then, the memory controller 310 loads a boot code in a boot block 121 (S410). The boot code loaded by the memory controller 310 is transferred to a boot RAM 320 (S510). A host accesses the boot code stored in the boot RAM 320 to perform a booting operation (S610).

Figure 9:
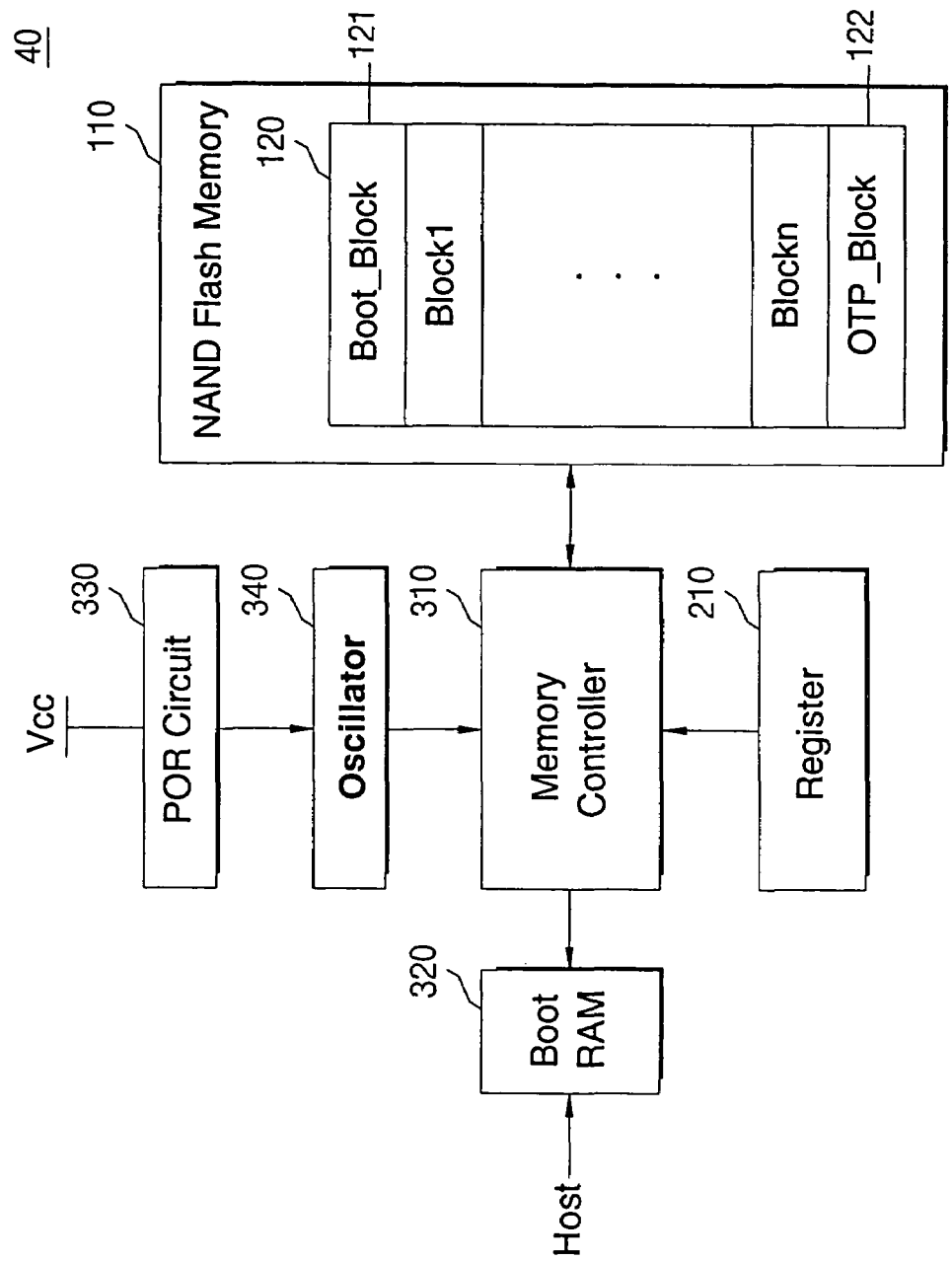
FIG. 9 is a block diagram of a memory system according to still another embodiment of the present invention.

FIG. 9 is a block diagram showing still another embodiment according to the present invention. The memory system 40 includes components bearing the same numerals as shown in FIG. 7. These components perform the same operations and functions as described for FIG. 7. According to the present embodiment, the memory system 40 further includes an oscillator 340 for delaying the application of voltage Vcc and thus also delaying the retrieval of the OTP dummy data for a predetermined time. The oscillator 340 serves the same function as delay circuit 400 as described for FIG. 4. According to a further aspect of the present embodiment, the memory system 40 including the NAND flash memory 110, the boot RAM 320, the register 210, the oscillator 340, and the memory controller 310 is preferably integrated in a single chip.

Figure 10:
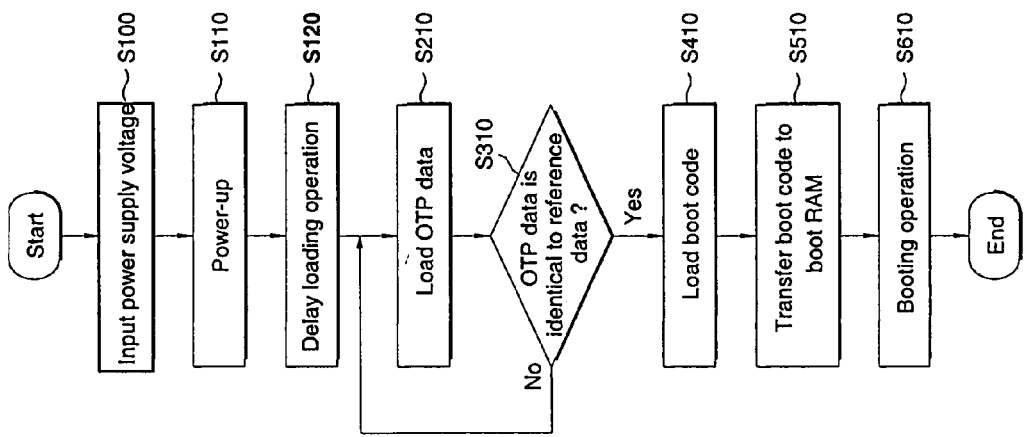
FIG. 10 is a flowchart illustrating an exemplary process of operation of the memory system of FIG. 9.

FIG. 10 is a flowchart showing the steps of booting the memory system 40 shown in FIG. 9. In the memory system 40, a boot code loading operation and a booting operation performed by a host are the same as that described above for FIG. 8. The step of delaying an OTP data loading (S120) is included between the power up step (S110) and the OTP data loading step (S200). The predetermined time of delay of oscillator 340 is preferably between 100 to 200 microseconds.

Having thus described exemplary embodiments of the present invention, it is to be understood that the invention defined by the appended claims is not to be limited by particular details set forth in the above description of exemplary embodiments as many apparent variations thereof are possible without departing from the spirit or scope of the invention as hereafter claimed.

We claim:

1. A memory system comprising;
   a main memory that stores main data and reference data;
   a first storage that stores the reference data; and
   a controller that, upon receipt of a power up signal, repeatedly accesses the reference data from the main memory and compares the reference data accessed from the main memory to the reference data in the first storage until the reference data accessed from the main memory matches the reference data in the first storage unit, and loads the main data into a second storage when the reference data accessed from the main memory matches the reference data in the first storage unit.

2. The memory system of claim 1, wherein the main data includes boot code.

3. The memory system of claim 1, wherein the reference data is predetermined code preloaded in the main memory and the first storage.

4. The memory system of claim 1, wherein the main memory is a nonvolatile memory.

5. The memory system of claim 4, wherein the reference data is prestored in a one time programmable (OTP) block.

6. The memory system of claim 1, wherein the main memory is a flash memory.

7. The memory system of claim 1, wherein the first storage is a register and the second storage is a RAM.

8. The memory system of claim 1, wherein the first storage is embedded in the controller.

9. The memory system of claim 1, wherein the controller and the main memory are embedded within a single chip.

10. The memory system of claim 1, wherein the memory system is disposed on a memory card.

11. A circuit comprising:
a memory having prestored boot code and reference data; and
a controller having a register with the prestored reference data, wherein upon power turn on the controller repeatedly accesses the reference data from the memory and compares the reference data accessed from the memory to the reference data stored in the register until the reference data accessed from the memory matches the reference data stored in the register, and loads the boot code into a boot RAM when the reference data accessed from the memory matches the reference data stored in the register.

12. The circuit of claim 11, further including a delay circuit that delays accessing the reference data for a given time period when power is turned on.

13. The circuit of claim 11, wherein the delay circuit is an oscillator.

14. The circuit of claim 12, wherein the given time period is about 100 to 200microseconds.

15. The circuit of claim 11, wherein the memory is a nonvolatile memory.

16. The circuit of claim 15, wherein the reference data is prestored in a one time programmable (OTP) block.

17. The circuit of claim 11, wherein the memory is a flash memory.

18. The circuit of claim 17, wherein the flash memory is a NAND type.

19. The circuit of claim 11, wherein the circuit is integrated in a single chip.

20. A method of loading data, comprising:
storing main data and reference data in a main memory;
storing the reference data in a first storage;
upon receipt of a power up signal, repeatedly accessing the reference data from the main memory and comparing the reference data accessed from the main memory to the reference data in the first storage until the reference data accessed from the main memory matches the reference data in the first storage unit, and loading the main data into a second storage when the reference data accessed from the main memory matches the reference data in the first storage unit.

21. The method of claim 20, wherein the first storage is a register and the second storage is a RAM.

22. The method of claim 20, wherein the main memory is a nonvolatile memory.

23. The method of claim 22, wherein the reference data is stored in a one time programmable (OTP) block.

24. The method of claim 20, wherein the main memory is a NAND flash memory.

25. The method of claim 20, wherein the main data includes boot code.

26. The method of claim 20, wherein the main data and reference data is preloaded in the main memory, the reference data is preloaded in the first storage and the power up signal is generated upon power turn on.

27. The method of claim 20, further including reaccessing the reference data from the main memory if the reference data retrieved from the main memory is not the same as the reference data in the first storage.

28. A method of booting a nonvolatile memory, comprising:
prestoring in a main memory a boot code and a reference data;
prestoring the reference data in a register;
when power is turned on, repeatedly accessing the reference data from the main memory and comparing the reference data accessed from the main memory to the reference data in the register until the reference data accessed from the main memory matches the reference data in the register, and loading the boot codes into a boot RAM when the reference data accessed from the main memory matches the reference data in the register.

29. The method of claim 28, further including performing a boot operation using the boot code in the boot RAM.

30. The method of claim 28, further including delaying for about 100 to 200 microseconds the accessing of the reference data from the main memory when power is turned on.

31. The method of claim 28, wherein the main memory is the nonvolatile memory.

32. The method of claim 31, wherein the reference data is stored in a one time programmable (OTP) block.

* * * * *